(12) United States Patent
Silverstein

(10) Patent No.: US 6,590,764 B2
(45) Date of Patent: Jul. 8, 2003

(54) PALMTOP COMPUTER STAND

(75) Inventor: D. Amnon Silverstein, Mtn. View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 09/987,678

(22) Filed: Nov. 15, 2001

(65) Prior Publication Data

US 2003/0090865 A1 May 15, 2003

(51) Int. Cl.[7] ................................................. G06F 1/16
(52) U.S. Cl. ...................... 361/683; 248/920; 312/223.2; 206/320
(58) Field of Search ................................. 361/683–686, 361/724–727; 248/917–923, 398; 312/223.1–223.6; 206/305, 320

(56) References Cited

U.S. PATENT DOCUMENTS 5,748,441 A * 5/1998 Loritz et al. ................. 361/683
6,141,052 A * 10/2000 Fukumitsu et al. .......... 348/373
6,262,884 B1 * 7/2001 Hwang et al. ............... 361/681
6,487,069 B1 * 11/2002 Onodera ...................... 361/683

* cited by examiner

*Primary Examiner*—Darren Schuberg
*Assistant Examiner*—Hung Van Duong

(57) ABSTRACT

A palmtop computer stand is provided. The palmtop computer stand includes a computing device, an imaging device and a cover. The imaging device pivotally couples with the computing device to capture an image of an object placed in close proximity to the computing device. The cover pivotally couples with the computing device such that the cover moves from a closed position into a lockable position. The cover supports the computing device and the imaging device at a fixed location relative to the cover in order to ensure precise image capturing of the object with the palmtop computer stand. Likewise, the cover supports a lens of the imaging device such that the lens is a fixed distance from a surface upon which the object rests.

21 Claims, 4 Drawing Sheets

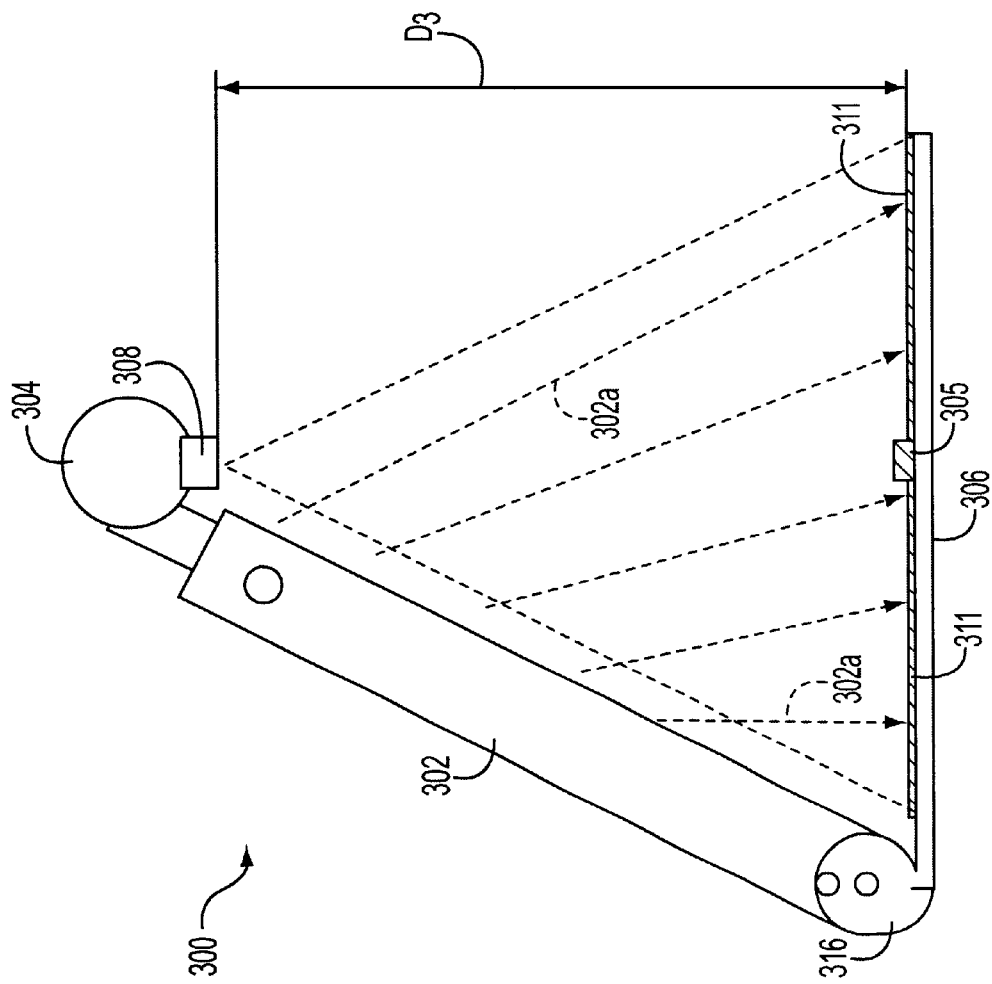

PALMTOP COMPUTER STAND

BACKGROUND OF THE INVENTION

1. Field of the Invention

The present invention relates generally to image capturing with portable computing devices and more specifically, the present invention relates to a palmtop stand for image capturing with a palmtop computer.

2. Description of Related Art

Portable computing devices, such as palmtop computers, have been used for image capturing of various items, such as business cards or the like. The capture of an image with a portable computing device is described in U.S. Pat. No. 5,748,441, the disclosure of which is hereby incorporated by reference in its entirety. U.S. Pat. No. 5,748,441 discloses a notepad computer having a camera retractably mounted within a cavity of the notepad computer. A housing and a cover of the portable computer define the cavity in which the camera resides.

During operation of the device disclosed in U.S. Pat. No. 5,748,441, a user pivots the camera in order to orientate the camera for image capturing. The user ascertains through trial and error, a proper orientation of the camera relative to the image to be captured by the camera.

Copy stands have been developed to improve the capturing of documents using a computing device. These devices tend to be large and non-portable. As such, a need exists for a portable device which allows a user to precisely capture images with a portable computing device.

BRIEF SUMMARY OF THE INVENTION

The present invention is directed to providing a palmtop computer stand which allows for precise image capturing with a portable computing device. The palmtop computer stand allows for precise, repeatable image capturing of objects placed in close proximity to the palmtop computer stand.

In one embodiment of the present invention, an apparatus for capturing an image is disclosed. The apparatus includes a computing device, an imaging device pivotally coupled with the computing device and a cover also pivotally coupled with the computing device. The imaging device captures an image of an object placed in close proximity to the computing device. The cover pivots from a closed position into a lockable position such that the cover supports the computing device and the imaging device at a fixed location relative to the cover. The cover can hold a lens of the imaging device a fixed distance from a surface upon which the object is placed. The fixed distance of the lens from the surface upon which the object is placed ensures precise image capturing of the object.

In another embodiment of the present invention, an apparatus having a computing device, an imaging device pivotally coupled with the computing device, and a cover operably coupled with the computing device, captures an image of an object. An exemplary method comprises moving the cover from a first position to a second position such that the cover supports the computing device and the imaging device a fixed location relative to the cover. The cover can hold a lens of the imaging device is a fixed distance from a surface upon which the object rests. The method can also include orientating the object in close proximity to the apparatus such that the apparatus captures an image of the object. After orientating the object into close proximity with the apparatus, a user captures an image of the object.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 3B shows a schematic of the palmtop computer shown with respect to FIG. 3A in accordance with one embodiment of the present invention.

DETAILED DESCRIPTION OF THE INVENTION

Figure 1A:
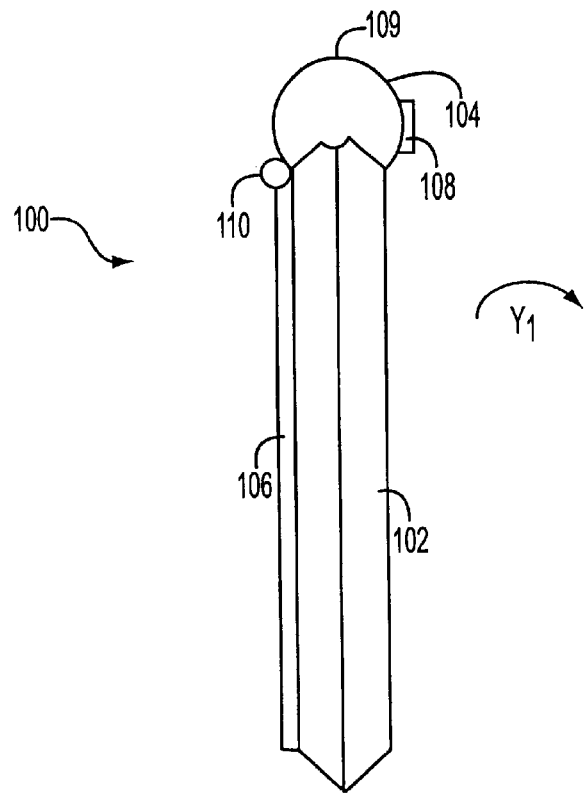
FIG. 1A is a schematic illustrating a palmtop computer configured for capturing an image of an object in accordance with one embodiment of the present invention.

The present invention relates to a computer and associated stand, such as a palmtop computer stand, configured to capture images. FIG. 1A is a schematic illustrating a computer configured for capturing an image in accordance with one embodiment of the present invention. The computer can be, for example, a palmtop computer 100 which includes a computing device 102, an imaging device 104 and a cover 106. The computing device 102 may be any device having a processor and memory, such as a Hewlett-Packard® Jornada® 520 Pocket Personal Computer available from Hewlett-Packard located in Palo Alto, Calif. The computing device 102 provides computing capability to the palmtop computer 100. As such, the computing device 102 processes an image captured by the imaging device 104. During use, a user orientates the computing device, the cover and the imaging device in order to capture an image of an object using the imaging device. The cover pivotally couples with the computing device, thereby allowing movement of the cover away from the computing device into an orientation suitable for image capturing.

The imaging device 104 captures an image of objects placed in close proximity to the palmtop computer 100, such as business cards, documents, or the like. The imaging device 104 may be any imaging device configurable for attachment with the computing device 102, such as a Hewlett-Packard® Jornada® 520 Pocket Camera available from Hewlett-Packard located in Palo Alto, Calif. The imaging device 104 includes a lens 108 which allows image capturing by the imaging device 104. During image capturing, the imaging device 104, along with the lens 108, rotates in a direction indicated by directional arrow $Y_1$, into a locking position (as shown with respect to FIG. 1B). The imaging device 104 and the lens 108 rotate via a hinge 109. In one embodiment of the present invention, the hinge 109 may be a pin assembly which allows rotation of the imaging device 104 in the direction indicated by the directional arrow $Y_1$ relative to the computing device 102. In addition to rotating the imaging device 104 and the lens 108, a user also rotates the cover 106 during image capturing with the palmtop computer 100.

The cover 106 covers the computing device 102 in a closed position when the palmtop computer is not image capturing. When a user desires to capture an image with the palmtop computer 100, the user rotates the cover 106 in a direction indicated by the directional arrow $Y_1$. The cover 106 rotates via a hinge 110. The hinge 110 pivotally couples the cover 106 with the computing device 102 at the same end as the imaging device 104, as may be seen with reference to FIG. 1A. The hinge 110 can be any known device which pivotally couples the cover 106 with the computing device 102, such as a rotatably mounted axle or the like. The hinge 110 allows rotation of the cover 106 in a direction indicated by the directional arrow $Y_1$ into a locking position. When the cover 106 rotates as indicated by the directional arrow $Y_1$, the cover 106 pivots around the imaging device 104 into the locking position, as shown with reference to FIG. 1B.

Figure 1B:
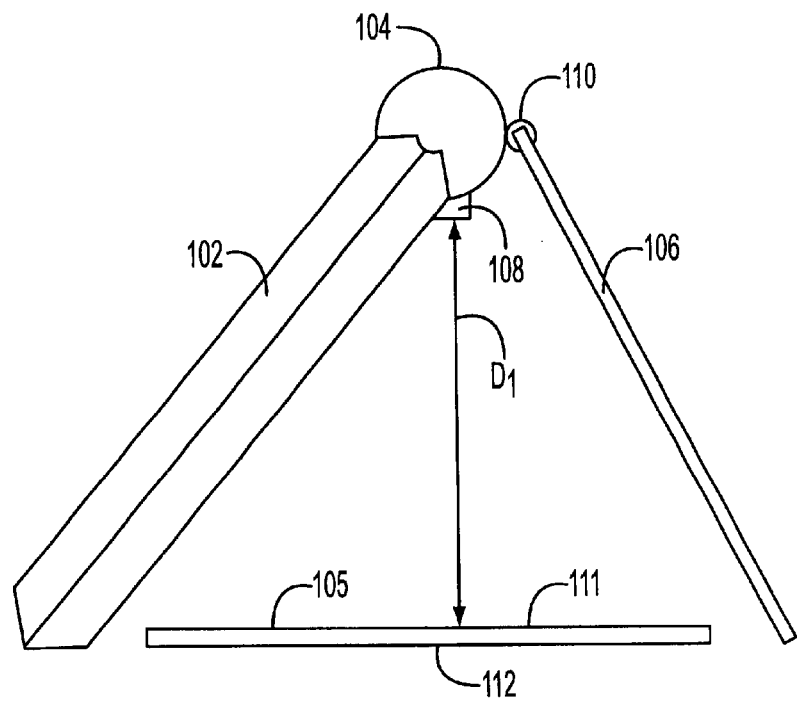
FIG. 1B is an embodiment of the present invention illustrating a schematic of the palmtop computer shown with reference to FIG. 1A in a locking position to form a stand.

FIG. 1B is an embodiment of the present invention illustrating a schematic of the palmtop computer 100 shown with reference to FIG. 1A in the locking position to form a stand. The palmtop computer 100 includes a detente within the imaging device 104 which locks the cover 106 into place when the computing device 102 and the cover 106 form the stand. Upon placement of the cover 106 into the locking position, the cover 106 supports the computing device 102 and the imaging device 104 at a fixed location. Placement of the computing device 102 and the cover 106 at the fixed location places the lens 108 of the imaging device 104 a fixed distance $D_1$ from a surface 112, as shown with respect to the Figure. Placement of the imaging device 104 and the lens 108 at the fixed distance $D_1$ from the surface 102 ensures proper imaging of an object 111, such as a business card. In addition to the embodiment shown with reference to FIGS. 1A and 1B, the palmtop computer 100 may also have the configuration shown with reference to FIG. 2A.

Figure 2A:
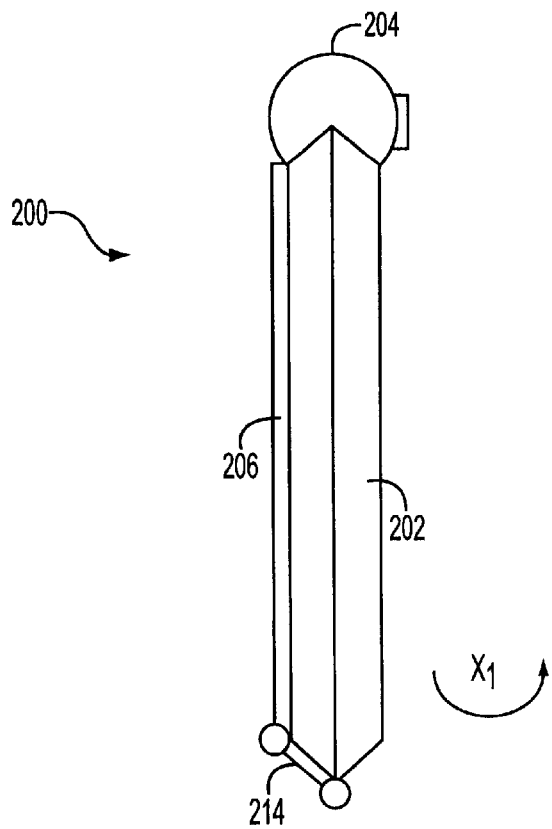
FIG. 2A illustrates a schematic of a palmtop computer in accordance with an alternative embodiment of the present invention.

FIG. 2A illustrates a schematic of a palmtop computer 200 in accordance with an alternative embodiment of the present invention. In this embodiment, the palmtop computer 200 includes a hinge 214 disposed at an end opposite of the imaging device 204. As described earlier with respect to the hinge 110, the hinge 214 may be any known device which pivotally couples the cover 206 with the computing device 202, such as a rotatably mounted axle or the like. When a user desires to capture an image with the palmtop computer 200, the user pivots the cover 206 in a direction indicated by a directional arrow $X_1$ from the closed position shown with respect to FIG. 2A to a locking position to form a stand as shown with reference to FIG. 2B.

Figure 2B:
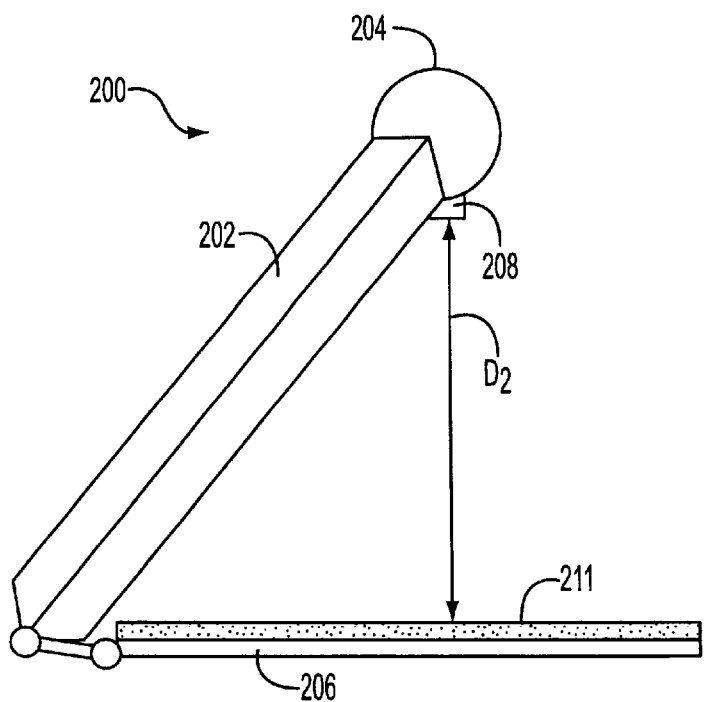
FIG. 2B is an embodiment of the present invention illustrating the palmtop computer shown with reference to FIG. 2A in a locking position.

FIG. 2B is an embodiment of the present invention illustrating the palmtop computer 200 shown with reference to FIG. 2A in the locking position. In this embodiment, the cover 206 holds the object 211 to be captured by the imaging device 204. When the cover 206 deploys into the locking position, the user pivots the imaging device 204 and the lens 208 in the same manner described with reference to FIGS. 1A and 1B. Once a user places the cover 206 in the locked position and pivots the imaging device 204 as shown with reference to the Figure, the lens 208 is a fixed distance $D_2$ from the cover 206. The fixed distance $D_2$ ensures proper image capturing of the object 211 placed on the cover 206.

Figure 3C:
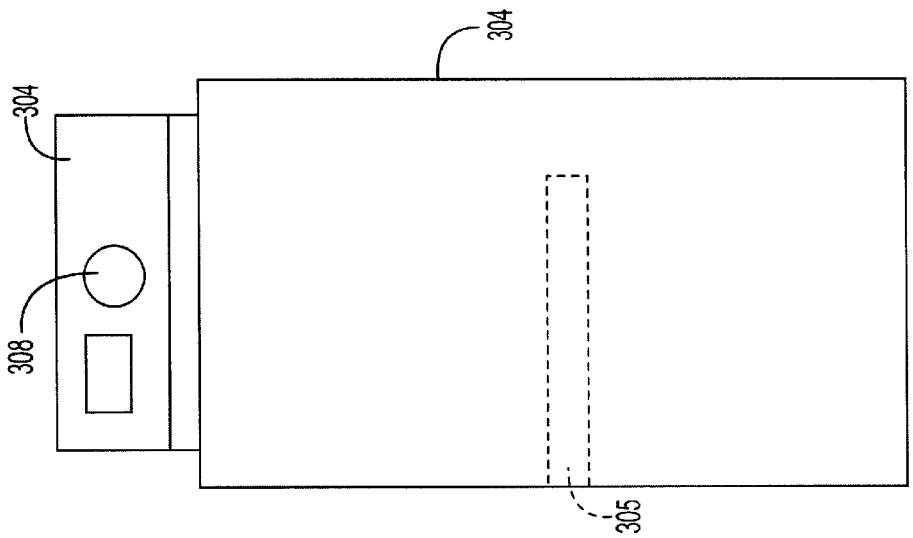
FIG. 3C is an embodiment of the present invention illustrating a schematic of the palmtop computer shown with reference to FIG. 3A.
Figure 3A:
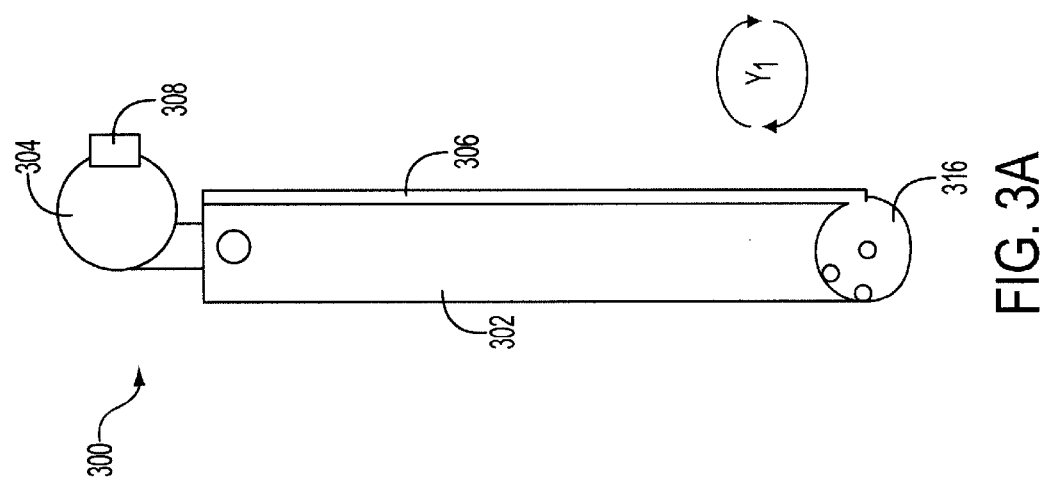
FIG. 3A illustrates a schematic of a palmtop computer in accordance with an embodiment of the present invention.

FIG. 3A illustrates a schematic of a palmtop computer 300 in accordance with an embodiment of the present invention. The configuration of the palmtop computer 300 includes the cover 306 on the same side as the lens 308. In addition, the palmtop computer 300 includes a hinge 316 which pivotally connects the cover 306 to the computing device 302 on an end opposite the imaging device 304. Therefore, when a user desires to capture an image of an object, the user pivots the cover 306 in a direction indicated by the directional arrow $Y_1$ such that the palmtop computer 300 forms a stand as shown with reference to FIG. 3B.

FIG. 3B shows a schematic of the palmtop computer 300 shown with respect to FIG. 3A in accordance with one embodiment of the present invention. Once the user pivots the cover 306, the user also pivots the imaging device 304 in the same direction as the cover 306, thereby forming the stand as shown. Upon formation of the stand with the palmtop computer 300, the lens 308 is a fixed distance $D_3$ from the cover 306. As described with respect to FIGS. 1B and 2B and the fixed distances $D_1$ and $D_2$, the fixed distance $D_3$ ensures proper image capturing of the object placed on the cover 306 for image capturing. It should be noted that in this embodiment of the present invention, during image capturing of an object, a screen 302a (shown with respect to FIG. 3B), which is a display screen of the computer, provides illumination for the object during image capturing, as indicated by lines 302b. During image capturing, a user sets the screen 302a to bright white such that the screen 302a functions as an illuminator during image capturing. In addition, the cover 306 may also include an indexer 305 for holding an object in place during image capturing. As seen in FIG. 3C, the indexer 305 can run laterally across a face of the cover 306. Thus, when the indexer 305 holds an object, such as the object 311, the object lies between the indexer 305 and the cover 306, as shown with reference to FIG. 3B.

Thus, exemplary embodiments provide a palmtop computer capable of capturing precise images of various objects. As such, the present invention saves time and money for consumers using the present invention. Moreover, the present invention minimizes frustration commonly associated with image capturing of relatively small objects such as business cards. The user simply forms the palmtop into a stand with the cover in a locking position and captures an image. When a user captures an image, the user may rest assured that the palmtop computer captured a precise image. Therefore, the user does not waste time or money with having to recapture the image. Furthermore, a user does not have to waste time figuring out how to properly orientate the palmtop computer in order to ensure proper image capturing. Instead, the locking position of the palmtop computer ensures proper image capturing.

The above are exemplary modes of carrying out the invention and are not intended to be limiting. It will be apparent to those of ordinary skill in the art that modifications thereto can be made without departure from the spirit and scope of the invention as set forth in the accompanying claims.

What is claimed:

1. An apparatus for capturing an image, the apparatus comprising:
   a computing device;
   an imaging device pivotally coupled with the computing device to capture an image of an object proximally placed to the computing device; and
   a cover pivotally coupled with the computing device for movement from a closed position into a lockable position at which the cover supports the computing device and the imaging device at a fixed location relative to the cover and at which a lens of the imaging device is a fixed distance from a surface.

2. Apparatus of claim 1, wherein the cover and the imaging device are both pivotally coupled to a common end of the computing device, the cover being configured to pivot about the imaging device.

3. Apparatus of claim 1, wherein the cover and the imaging device are pivotally coupled to opposite ends of the computing device.

4. Apparatus of claim 1, wherein the cover pivotally couples with the computing device such that the cover pivots around the imaging device from the closed position into the lockable position.

5. Apparatus of claim 1, wherein the computing device is a pocket personal computer.

6. Apparatus of claim 1, the apparatus further comprising:
means for restraining movement of the cover such that in an open position, both the computing device and the cover support the imaging device the fixed distance from the surface upon which an end of the computing device and an end of the cover rest.

7. Apparatus of claim 1, wherein an object to be captured with the image capturer rests on the surface such that the lens of the image capturer is the fixed distance from the lens.

8. Apparatus of claim 5, wherein the computing device includes an indexer.

9. Apparatus of claim 6, wherein the cover operably couples with the computing device with a hinge such that the cover rotates about an end of the computing device.

10. Apparatus of claim 8, wherein the indexer is configured to allow proper image capturing of the object.

11. Apparatus of claim 8, wherein the imaging device is a camera.

12. Apparatus of claim 9, wherein the cover rotates such that the computing device and the cover form a stand to capture the image of the object.

13. Apparatus of claim 9, wherein the configuration of the cover allows holding of the object during image capturing.

14. A method for capturing an image using an apparatus having a computing device, an imaging device pivotally coupled with the computing device and a cover operably coupled with the computing device, the method comprising:
moving the cover from a first position to a second position such that the cover supports the computing device and the imaging device a fixed location relative to the cover and at which position a lens of the imaging device is a fixed distance from a surface;
orientating an object in close proximity to the apparatus such that the apparatus captures an image of the object; and
capturing the image of the object using the imaging device.

15. A method for capturing an image as recited in claim 14, wherein the computing device is a handheld pocket personal computer.

16. A method for capturing an image as recited in claim 14, wherein the imaging device is a camera.

17. A method for capturing an image as recited in claim 14, wherein the cover and the computing device form a single unit in the first position.

18. A method for capturing an image as recited in claim 14, wherein the cover forms a stage for holding the object during the image capturing operation as the cover is in the second position.

19. A method for capturing an image as recited in claim 14, wherein the cover is in a lockable position in the second position such that the computing device and the cover form a stand when the cover is in the second position.

20. A method for capturing an image as recited in claim 14, wherein the operation of capturing the image of the object further comprises:
rotating the imaging device upon orientation of the object within close proximity of the apparatus such that the imaging device captures the image of the object.

21. A method for capturing an image as recited in claim 14, wherein the computing device functions as a light diffuser during the image capturing operation.

* * * * *